UNITED STATES PATENT OFFICE.

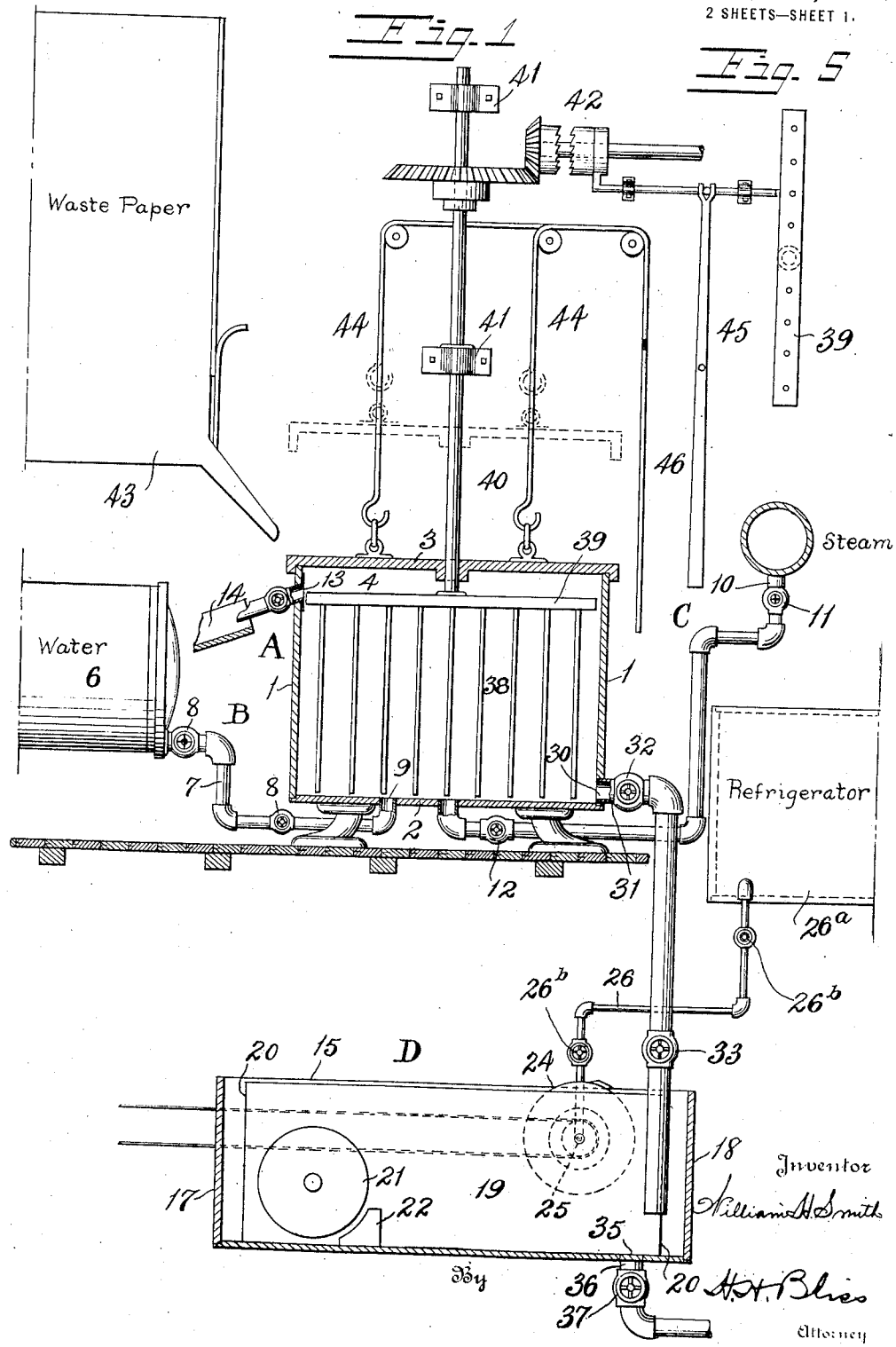

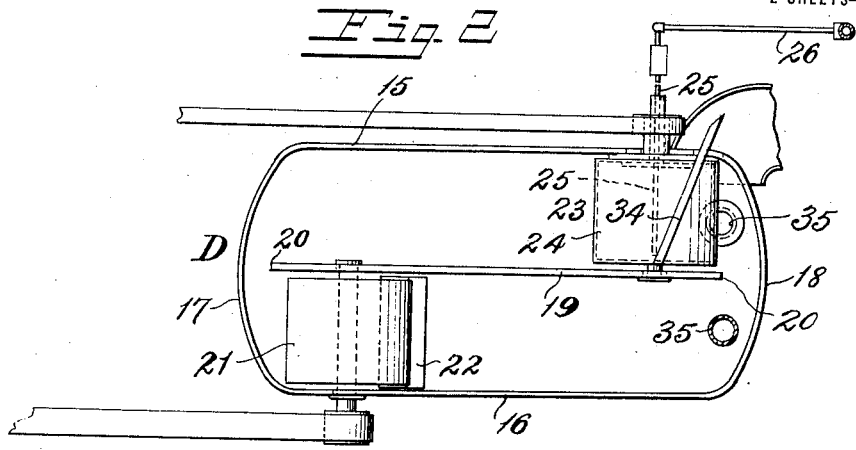
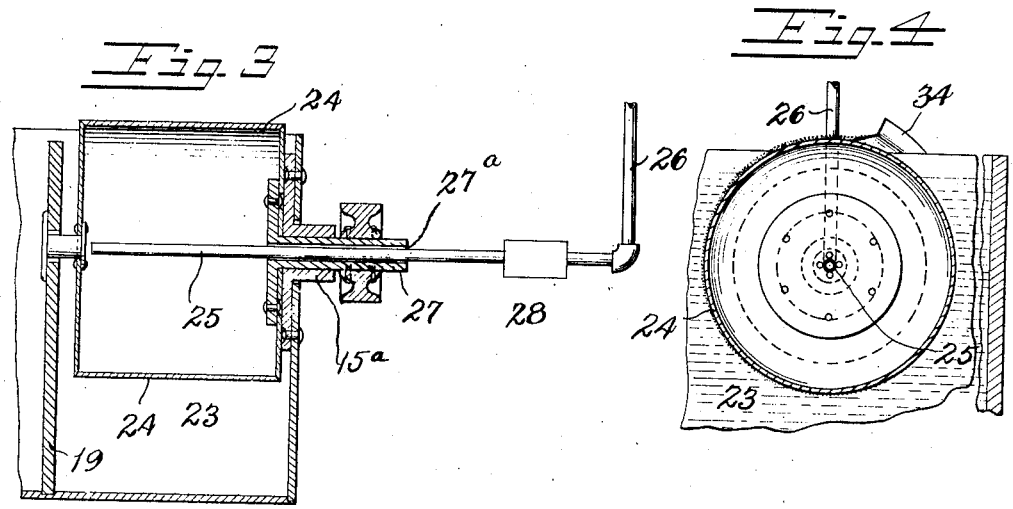

WILLIAM HAROLD SMITH, OF WASHINGTON, DISTRICT OF COLUMBIA.

SEPARATING WAXLIKE MATERIAL FROM PAPER-STOCK.

1,352,553.  Specification of Letters Patent.  Patented Sept. 14, 1920.

Application filed November 21, 1916, Serial No. 132,711. Renewed January 23, 1920. Serial No. 353,591.

*To all whom it may concern:*

Be it known that I, WILLIAM H. SMITH, a citizen of the United States, residing at Washington, in the District of Columbia, have invented certain new and useful Improvements in Separating Waxlike Material from Paper-Stock, of which the following is a specification, reference being had therein to the accompanying drawing.

This invention relates to an improved method and an apparatus for obtaining valuable products from what is now treated as waste paper; namely, the paper which is initially coated or charged with a body of material adapted to be melted or softened by heat and to be withdrawn by a suspending or solvent fluid. For example, use is now made, to a wide extent in various arts and industries, of paper which is preliminarily coated or charged with wax, paraffin, or similar materials, these being applied to the paper generally to prepare it for use in making waterproof receptacles, or wrappers to be applied to receptacles, whose contents it is desirable to isolate entirely from moisture and the external atmosphere and other outside bodies.

In some cases the paper is initially quite thin and flexible. In others, it is thicker and less flexible, but is generally paper produced from pulp stock.

At the present time vast quantities of such paper are accumulated after the several sections thereof have served their purpose as packages or wrappers for receptacles or packages.

The waxed, paraffined, or similarly treated, paper which is miscellaneously accumulated in the waste masses that are gathered together after use, must be separated therefrom if an attempt is to be made to recover the paper stock in those pieces of paper in the accumulated masses which are not coated or charged. If in these accumulated waste masses there are any pieces of paper which have been coated or charged in the way described, the foreign materials which they carry impede the recovery of the paper stock from those pieces in the mass which are not charged with such material, and, where the proportion of foreign materials is high, they thwart entirely the attempt to recover the paper; for these foreign materials become disseminated through the whole mass of paper pulp and prevent the recovery of the paper in a pure form.

The manual separating of the coated or charged pieces of paper from the miscellaneous accumulated masses of waste is a matter of considerable expense, and in many cases the expense is so great that the entire accumulation must be destroyed by burning, as the expense of separating the coated or charged parts of the paper from the uncoated or uncharged parts is not justified.

Again, at the mills or factories where the paper in large quantities is initially coated or charged with waterproofing or antiseptic material, there is a high percentage of the product which, at the end of the steps of treatment, is inferior in quality from one cause or another. Where it is treated in sheets, many of these sheets will be so inferior that they will have to be thrown out and treated as waste. If the paper is treated in strips or wide continuous sheets, there are, at many places in each of such sheets, sections which require cutting out; and they are similarly thrown away. These parts of the stock being unsalable and the paper being non-recoverable, great loss is caused, and this loss must be distributed (with a consequent increase in price) over those parts of the stock which are selected as salable.

The object of this invention is to provide a means for recovering, from waste paper of the class specified, all of the original paper stock, and also all of the material with which it has been coated or charged for waterproofing or for rendering it antiseptic; and thereby justifying the expense of separating the treated paper from the miscellaneous masses of accumulated waste. The object is also to provide a method and apparatus by which, at the factories, large quantities of inferior and waste stock can be so treated as to avoid the loss that has been heretofore incident to the manufacture of such treated paper.

In the drawings I have shown one of the numerous mechanisms that can be used in carrying out my process.

Figure 1 shows an apparatus embodying my improvements and by which my process can be carried out;

Fig. 2 is a plan view of the lower part of the apparatus shown in Fig. 1;

Fig. 3 is a vertical section showing the congealing drum and adjuncts.

Fig. 4 is a vertical section of the drum in Fig. 3.

Fig. 5 is a plan view of the stirring device detached.

In the drawings A represents a tank or vat adapted to hold water and steam. It can be of any suitable size to correspond to the amount of work to be performed; and of any preferred shape. It is shown as having cylindrical side walls 1, a bottom 2, and the top at 4 having a suitable cover 3 applied thereto. With it are connected means, at B, for supplying water, these, as shown, comprising a vessel at 6, a duct 7 with valves at 8, and an inlet 9.

With it is also combined a steam-introducing apparatus C. This comprises a duct 10 extending either from a boiler or special steam generator, or from the steam exhaust of a neighboring engine apparatus. This steam duct is provided with valves or controlling devices at 11 and 12.

At 13 is the overflow for the material which rises to the top of the mass in the vat or tank A, this overflow, delivering the overflowing material to a chute or duct 14 which conveys it to any suitable collecting vessel.

At 30 is shown a main discharge passage through which the fluid contents can be withdrawn from the vat. With this there is connected a duct 31 provided with suitable valves at 32 and 33.

The vessel or receptacle in which the later stages of treatment are carried on is indicated by D. Preferably it is substantially of the conformation shown, that is to say, elongated horizontally in one direction and formed with curved ends; 15 and 16 indicating the side walls, and 17 and 18 the curved end walls.

A vertical diaphragm or partition 19 is positioned along the central vertical longitudinal plane. It is shorter than the interior length dimension so that there are open passages left between its ends 20 and the curved end walls. In one of the side compartments (in that between the partition 19 and the side wall 16) there is arranged a macerating roller 21 which sets in conjunction with a concave or inclined step piece 22 on the bottom of the tank D to macerate the paper stock and elongate its fiber, the roller 21 also serving as a propeller for the fluid mass which is contained in the tank. These parts 21 and 22 are merely conventionally illustrated and can be of any suitable form.

On the opposite side of the partition 19 (the side between the partition and the outer side wall 15) there is arranged a congealing and collecting device 23. This consists of a smooth surface metallic cylinder 24 mounted on a horizontal axis. It extends across the space between the partition and the side wall and has its axis so positioned that the lower section of the periphery of the roller is immersed in the fluid mass in the tank.

Provision is made for having a current of water flow into a tank from the drum. As shown, it has a centrally fitted pipe 25 which is rigidly connected to a tubular journal 27. The latter is mounted in a bearing at 15$^a$. The journal 27 fits tightly to the pipe 25, and has small water escape passages 27$^a$. The central pipe 25 is supplied from the stationary duct 26, there being at 28 a suitable fluid-tight union. The pipe 26 leads from the refrigerator at 26$^a$ with suitable valves 26$^b$.

At 34 there is a scraper and collector arranged with its operative edge close to the surface of the cylinder 24, this scraper being so shaped and positioned as to cause the outward travel of material that may collect upon it. Or it may be arranged so as to merely collect material from the surface of the roller and supplemental devices may be used to cause the outward travel of such material.

At 35 there is shown an orifice for the discharge of the fluid mass from the tank D when required, there being a duct 36 connected at the orifice and a valve 37 for controlling the flow.

In some cases, an agitating or stirring of the contents in the receptacle A will be required from time to time. Device for this purpose is shown consisting of a series of rods or teeth 38 supported by the rotary carrier bar 39. This bar is attached to the shaft 40 which is mounted in bearings 41 and is provided with driving devices at 42. When the receptacle is to be charged with paper from the bin or holder 43, the cover 3 can be raised by lifting devices, such as ropes 44 connected at 45 to the hand-pull 46. When it is desired to agitate or stir the contents of the vat, the shaft 40 is by suitable clutch connected to power and set into rotation. When the mass in the vat should be quiescent, the power is thrown off and the agitating device at 38 remains stationary.

With the above apparatus, or any suitable modification thereof, the following steps are taken in treating the coated or charged paper. A mass thereof is introduced into the upper tank A, and a volume of water is also introduced by opening the valves or controlling devices. The material is allowed to become thoroughly soaked; and then the steam duct is opened and steam is introduced. The temperature of the mass is brought gradually to the point where all of the wax or paraffin is softened and melted. A large percentage of it, by reason of its low specific gravity, rises to the top of the fluid mass. The contents of the tank are agitated when necessary, from time to time, so as to be kept thoroughly stirred to permit the released wax and paraffin to escape and rise. The volume of the water and the quantity of steam are so controlled as to keep the level of the fluid mass near the horizontal plane of the overflow 13. After the treatment has been carried sufficiently far, the operator learns from the indications at the overflow when the separating in the tank A has about reached its possible limit.

During this period the paper has been largely reduced to a mass of pulp, but I have found it difficult to secure, in the tank A, an absolutely complete separation of the paper pulp from the materials with which it was charged; some of the wax or paraffin persisting in adhering to the stock and rendering the latter valueless for the re-manufacture of paper.

After the separation has been carried to the limit attainable with economy during the first stage of treatment in the receptacle A, I transfer the fluid mass to the second receptacle D. The valve 32 is opened so that the fluid contents of the vat A can escape, and, by means of the valve 33, the discharge into the receptacle D can be regulated. This vessel is filled to a suitable level, ordinarily to a plane near the top of the partition 19. The fluid mass is still more or less highly heated, and the agitation and steaming has conditioned the components of the mass in such way that the liquid more or less suspends the pulp and foreign materials, so that it can flow around the tank D as an approximately homogeneous fluid.

The macerating and fiber-elongating devices at 21, 22 are set in operation. The fluid is caused to flow gradually under the roller 21, the clots or submasses of stock are triturated and disseminated throughout the fluid, and the waxy or paraffined particles are exposed.

The rotation of the roller 21 maintains a circulation of the fluid along the side channels and around the partition 19 at the ends of the tank. As the fluid comes to, and contacts with, the chilled surface of the congealing and collecting cylinder 24, the difference in temperature is such that the particles of wax and paraffin are instantly cooled and congealed and form relatively hardened films or accumulations upon the smooth surface of the cylinder. The latter is slowly rotated and the congealed films or accumulations come to the scraper at 34 which cuts or scrapes it from the surface, and it is so shaped that the removed material is crowded or forced laterally, and is finally delivered at the end of the roller, and taken away at the side of the tank.

By the time the fluid mass has made a few circuits around the tank through the channel, all the wax or paraffin is withdrawn by the congealing device and separated from the mass.

There is then left in the fluid only the particles of pulp stock which can be run off from the tank and treated in the ordinary way for the recovery of the paper. The foreign material (wax, paraffin, or the like) which is collected from the surface of the fluid in the tank and that which is accumulated at the congealing device are collected and subjected to any further treatment for cleansing and refining that may be found necessary. But when the process is properly carried on, the two materials that are recovered (the paper stock, on the one hand, and the wax, paraffin, or the like, on the other) are practically ready for immediate use in the production of paper and for waxing it.

While I have above given a specific description of one form of apparatus and one series of steps for carrying out my invention, it will be seen that there can be numerous modifications in respect to both. I prefer to subject the material to two stages of treatment in two differing vessels, such as those at A and D. But under some circumstances, I may subject the mass to both treatments while holding it in a single vessel, that is to say, subjecting it to the action of water and heat until the paper has been softened and the foreign material has been softened and melted sufficiently to have the major part thereof carried by or through the water to the surface and there withdrawn, and then, while the fluid mass remains in the same vessel, effect the lowering of the temperature of the particles of the residue of the foreign material and cause them to form relatively hardened accumulations or films which, in turn, are separated from the fluid.

What I claim is:

1. The herein-described method of treating paper stock coated or charged with a foreign material of the wax and paraffin class, it consisting in subjecting a mass of such paper to the action of water and heat, causing the softening of the paper and the softening or melting of the foreign material, causing the major part of the foreign material to separate from the paper through its difference in specific gravity after it has been softened or melted and separating it from the fluid at the surface thereof, then causing the residue of the foreign material to separate from the paper and fluid and form relatively hardened accumulations, and removing said accumulations bodily from the fluid, substantially as described.

2. The herein-described method of treating paper material coated or charged with a foreign material of the wax and paraffin class, it consisting in subjecting a mass of such paper to the action of water and heat, causing the softening of the paper and softening or melting of the foreign material, causing the major part of the foreign material to separate from the paper through its difference in specific gravity after it has been softened or melted and separating it from the fluid at the surface thereof, then causing the residue of the foreign material to separate from the paper and from the fluid and to form, in regions below the surface of the fluid, relatively hardened accumulations, and removing said accumulations bodily from the fluid.

3. The herein-described method of treating paper material coated or charged with a foreign material of the wax and paraffin class, it consisting in subjecting a mass of such paper to the action of water and steam, causing the softening of the paper by the water and the steam and the softening or melting of the foreign material by the steam, causing the major part of the foreign material to separate from the paper through its difference in specific gravity after it has been softened or melted and separating it from the fluid at the surface thereof, then causing the residue of the foreign material to separate from the paper and fluid by lowering the temperature of the foreign material sufficiently to cause it to form relatively hardened accumulations, and removing said accumulations from the fluid.

4. The herein-described method of treating paper stock coated or charged with a foreign material of the wax and paraffin class, it consisting in immersing a mass of such paper in a body of water, heating the fluid, causing the softening of the paper and the softening or melting of the foreign material, causing the major part of the foreign material to separate from the paper through its difference in specific gravity after it has been softened or melted, separating it from the fluid at the surface thereof, then subjecting the residue of the foreign material to a low temperature to cause it to separate from the paper and from the fluid and form relatively hardened accumulations, and removing said accumulations from the fluid.

5. The herein-described method of treating paper stock coated or charged with a foreign material of the wax or paraffin class, it consisting in subjecting a mass of such paper to heat and softening or melting the foreign material while the paper is immersed in a body of fluid adapted to conduct the softened and melted foreign material away from the paper, removing the major part of the foreign material by flowing it away from the fluid mass, then causing the residue of the foreign material to separate from the paper and fluid and form relatively hardened accumulations, and removing said accumulations from the fluid.

6. The herein-described method of treating paper stock coated or charged with a foreign material of the wax or paraffin class, it consisting in subjecting a mass of such paper to heat and softening or melting the foreign material while the paper is immersed in a body of fluid adapted to conduct the softened and melted foreign material away from the paper, removing the major part of the foreign material by flowing it away from the fluid mass, then reducing the temperature of the residue of the foreign material to its congealing point and causing to to form relatively hardened accumulations, and removing said accumulations from the fluid.

In testimony whereof, I affix my signature, in presence of two witnesses.

WILLIAM HAROLD SMITH.

Witnesses:
J. HENRY BROWN,
GEORGE E. EDELIN.